(12) United States Patent
Escobar et al.

(10) Patent No.: US 9,331,486 B2
(45) Date of Patent: May 3, 2016

(54) METHOD AND APPARATUS FOR DETECTING ISLANDING CONDITIONS OF A DISTRIBUTED GRID

(71) Applicant: ABB Research Ltd, Zürich (CH)

(72) Inventors: Gerardo Escobar, Merida (MX); Sami Pettersson, Wettingen (CH); Leonardo-Augusto Serpa, Zürich (CH); Ngai-Man Ho, Fislisbach (CH); Antonio Coccia, Baden (CH); Alexandre Oudalov, Fislisbach (CH); Adrian Timbus, Daettwil (CH)

(73) Assignee: ABB RESEARCH LTD, Zurich (CH)

( * ) Notice: Subject to any disclaimer, the term of this patent is extended or adjusted under 35 U.S.C. 154(b) by 784 days.

(21) Appl. No.: 13/668,797

(22) Filed: Nov. 5, 2012

(65) Prior Publication Data
US 2013/0114302 A1 May 9, 2013

(30) Foreign Application Priority Data
Nov. 4, 2011 (EP) .................................... 11187790

(51) Int. Cl.
*H02J 7/00* (2006.01)
*H02J 3/38* (2006.01)

(52) U.S. Cl.
CPC ............. *H02J 3/38* (2013.01); *H02J 2003/388* (2013.01)

(58) Field of Classification Search
CPC ........... H02J 5/005; H02J 17/00; H02J 7/025; H02J 7/35; H02J 3/386; H02J 3/382; H02J 3/32; H02J 3/38; H02J 3/383; H02J 7/0055; H02J 1/10; H02J 1/102; H02J 2003/003; H02J 2003/388; H02J 2007/0062
USPC ................................................. 320/100–108
See application file for complete search history.

(56) References Cited

U.S. PATENT DOCUMENTS

| | | | |
|---|---|---|---|
| 7,304,403 B2 * | 12/2007 | Xu ............................ | H02J 3/38 307/84 |
| 7,408,268 B1 | 8/2008 | Nocentini et al. | |
| 2003/0165036 A1 | 9/2003 | Tuladhar | |
| 2007/0143044 A1 | 6/2007 | Huang et al. | |
| 2008/0204044 A1 | 8/2008 | Ponnaluri et al. | |
| 2011/0115301 A1 * | 5/2011 | Bhavaraju ................ | H02J 3/38 307/86 |

FOREIGN PATENT DOCUMENTS

EP 1764894 A1 3/2007

OTHER PUBLICATIONS

European Search Report issued on Mar. 28, 2012, for European Application No. 11187790.

* cited by examiner

*Primary Examiner* — Binh Tat
(74) *Attorney, Agent, or Firm* — Buchanan Ingersoll & Rooney PC

(57) ABSTRACT

An exemplary method and apparatus for detecting islanding conditions of a distributed grid are disclosed, wherein transfer of power through a power electrical unit is controlled on the basis of a control reference. The apparatus includes a first stage and a second stage performing a respective portion of the method. The first stage injects a reactive component to the control reference, and, for at least one electrical quantity of the grid, determines a change in the quantity induced by the injected component, and determines, on the basis of the change in the electrical quantity, whether to move to the second stage of the method. The second stage, for at least one electrical quantity of the grid, determines a value of the electrical quantity, forms a positive feedback term using at the determined value adding a positive feedback term to the control reference, determines a change in an electrical quantity induced by the feedback term, and determines islanding condition on the basis of the change in the quantity induced by the feedback term.

12 Claims, 6 Drawing Sheets

METHOD AND APPARATUS FOR DETECTING ISLANDING CONDITIONS OF A DISTRIBUTED GRID

RELATED APPLICATION

This application claims priority under 35 U.S.C. §119 to European Application No. 11187790.8, filed in Europe on Nov. 4, 2011, the content of which is hereby incorporated by reference in its entirety.

FIELD

The present disclosure relates to distributed power generation and to detecting islanding conditions of a distributed power grid.

BACKGROUND INFORMATION

Distributed generators (DG) provide means for generating power locally. Instead of centrally producing power to a main grid in a power plant, the power grid may be powered by a plurality of distributed generators.

A distributed generator may include, for instance, a power source, such as a solar panel array or a wind turbine, and means for converting the power produced by the power source into a form in which it can be fed to the power grid. A frequency converter, for instance, may be used as the means for connecting the power source to the power grid.

Islanding conditions refer to a state of a power grid in which a part of the electrical power grid is separated from the rest of the power grid. In this disclosure, a part which is separable from the rest of the power grid is referred to as a "distributed power grid", a "distributed grid", or simply a "grid". The part of the power grid from which the distributed grid may be separated is referred to as a "main grid".

A distributed generator may continue its operation under islanding conditions, thus, producing power to the distributed grid. This may be a part of the function of the distributed generator. However, it may be important to stop the power production if an unintentional island has been produced. An unintentional island may, for instance, be caused by opening a breaker circuit either by maintenance personnel or simply because it has automatically tripped.

Unintentional islanding can be dangerous to maintenance personnel. They may be unaware that a part of the power grid is still powered even though the connection to the main grid has been cut. Further, unintentional islanding may damage customer equipment because of uncontrolled voltage and frequency transient excursions during the islanding conditions and during the reclosing into an island.

Therefore, it can be extremely important, for instance, in photovoltaic (PV) inverters to have a mechanism which immediately reacts upon detection of loss of main grid power and stops the power production.

In many cases, detecting the loss of main grid power may be relatively easy, as islanding can create under/over voltage and under/over frequency conditions. These conditions can be detected and used by, for instance, relays of a generator in the distributed grid to disconnect, and, thus, stop the power production.

However, when the power (both active and reactive components) generated by a distributed generator closely matches the power consumed by load or loads, detection of the islanding may become extremely difficult. Thus, the distributed generator may continue operation without detecting the islanding conditions [1].

The specification for detecting unintentional islanding in distributed power generation systems, and, for example, in PV inverters, has motivated an intensive research and development of different detection methods. Several standards have been established to specify the conditions for disconnection during unintentional islanding. For instance, the Underwriters Laboratories Standard UL 1741 calls for tripping of a distributed generator within 2 seconds after loss of the main grid power [4]. The German Standard DIN VDE 0126-1-1 proposes several islanding detection methods [5].

Methods for detecting islanding conditions may be divided in three categories: passive methods, communication-based methods, and active methods [1, 2, 3]. These methods can also be divided into internal and external methods where an internal method may, for instance, reside inside a distributed generator, and an external method may, for instance, be implemented as an external device, between the distributed generator and the main grid.

Passive methods can monitor variables of the distributed grid in order to find abnormal changes in, for instance, frequency, voltage amplitude, phase angle, harmonics contents, etc. Passive methods can be effective in most situations. However, their non-detection zone (NDZ), e.g., the range of loads for which the islanding detection method may fail, can be large.

Communication-based methods usually operate on the basis of establishing communication channels between distributed generators and the main grid. Communications-based methods can detect islanding conditions even when the power produced matches the power consumed. However, the communications devices can be expensive. Implementing a communication-based method may also call for co-operation of the main grid provider.

Active methods can detect a main grid power disconnection on the basis of observations on the response of the distributed grid to a disturbance intentionally introduced by the method. The response, or its magnitude, depends on the presence of the main grid power. Thus, islanding conditions may be determined on the basis of the response. In this manner, the NDZ can be minimized.

However, the injected disturbances may decrease the quality of the power produced. The disturbance introduced to the network for islanding detection purposes may have a pre-defined maximum limit in order to keep the quality of the produced power at an acceptable level. For instance, according to standard UL 1741, the variations of the active and reactive power injected to the network should not exceed ±3% of the rated apparent power of the distributed generator.

An active method may, for instance, be implemented by introducing a small reactive current component in the current reference of a current controller of a distributed generator. Then, the method may monitor changes in, for instance, the load voltage, frequency and/or phase and detect islanding conditions on the basis of the changes [7, 8, 9].

Another approach for an active method is to implement a positive feedback. A positive feedback of a distributed grid quantity, such as voltage, frequency or phase, may be added to a control reference controlling the produced power [10, 11]. For instance, in a voltage feedback scheme, the inverter may command more real power (or active current) when the distributed grid voltage amplitude is increased. As a result, the voltage keeps increasing to balance the real power. This continues until the voltage amplitude exceeds the protection limits, and thus the islanding can be detected. Similar approaches may be applied for a frequency feedback or a phase feedback.

The positive feedback can be a very effective method in detecting islanding, as it forces the trajectories of voltage and frequency to abandon their monitored protection limits, thus producing an imminent detection of abnormal operation. Some authors propose to maintain continuous operation of these positive feedback schemes, under the assumption that the effect will be negligible during normal operation, e.g., during main grid connection, and will become unstable only if an islanding condition arise.

However, there may be situations where the positive feedback methods can cause instabilities, even during normal operation conditions, e.g., under main grid connection.

SUMMARY

An exemplary method for detecting islanding conditions of a distributed grid, wherein transfer of power through a power electrical unit in the distributed grid is controlled on the basis of a control reference is disclosed, the method comprising: a first stage and a second stage, wherein the first stage comprises: injecting a reactive component to the control reference; and for at least one electrical quantity of the grid: determining a change in the quantity induced by the injected component, and determining, on the basis of the change in the electrical quantity, whether to move to the second stage of the method, and wherein the second stage comprises, for at least one electrical quantity of the grid: determining a value of the at least one electrical quantity; forming a positive feedback term using the determined value; adding a positive feedback term to the control reference; determining a change in an electrical quantity induced by the feedback term; and determining an islanding condition on the basis of the change in the quantity induced by the feedback term.

An exemplary apparatus for detecting islanding conditions of a distributed grid is disclosed, wherein transfer of power through a power electrical unit is controlled on the basis of a control reference, the apparatus comprising: a first stage and a second stage, wherein the first stage comprises: means for injecting a reactive component to the control reference; and for at least one electrical quantity of the grid: means for determining a change in the quantity induced by the injected component, means for determining, on the basis of the change in the electrical quantity, whether or not to enable the second stage, and wherein the second stage comprises, for at least one electrical quantity of the grid, means determining a value of the electrical quantity; means for forming a positive feedback term using the determined value; means for adding a positive feedback term to the control reference; means for determining a change in an electrical quantity induced by the feedback term; and means for determining islanding condition on the basis of the change in the quantity induced by the feedback term.

BRIEF DESCRIPTION OF THE DRAWINGS

In the following the disclosure will be described in greater detail by means of exemplary embodiments with reference to the attached drawings, in which.

DETAILED DESCRIPTION

Figure 1A:
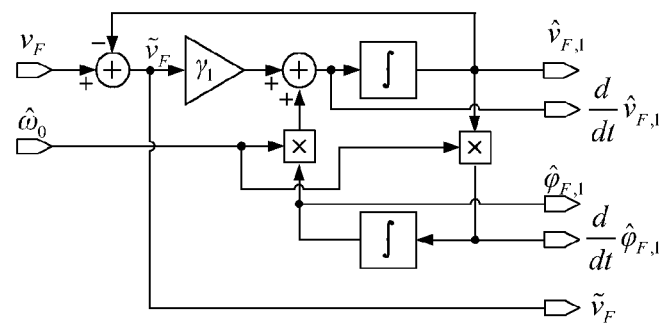
FIGS. 1a to 1f illustrate various segments of an exemplary method for supplying power to a grid in accordance with an exemplary embodiment of the present disclosure.

Exemplary embodiments of the present disclosure provide a method and apparatus for implementing an exemplary method to alleviate the above disadvantages.

The exemplary embodiments provide a method for detecting islanding conditions of a distributed grid. The method operates on the basis of a principle of injecting a relatively small disturbance, for instance, in the form of a reactive current, into the distributed grid. The method uses two approaches in a two-stage process.

In the first stage, the method monitors effects of the injected disturbance to a grid quantity or quantities, such as, for instance, the rate of change of voltage (ROCoV) and the rate of change of frequency (ROCoF). The disturbance can be dimensioned such that it causes only a negligible effect on these variables during normal operation, and a considerably larger effect when the main grid power is disconnected.

The monitored quantities may then be compared to predefined thresholds, and the events these thresholds being exceeded may be counted. After a given number of these events has occurred within a given time, the first stage may presume that an islanding is detected, and then a second stage is enabled.

In the second stage, a positive feedback loop or loops are enabled. If islanding conditions are present, the monitored quantities abandon their normal operation ranges, thus exceeding the over/under protection limits and, thereby, confirming the islanding conditions. Voltage amplitude variation and frequency variation, for instance, may be used for the positive feedback.

By using the two-stage approach of the disclosed method, a more effective and precise detection of islanding condition can be achieved. The disclosed method minimizes the possibility of false tripping by reducing sensitivity to other perturbations. It also minimizes instabilities as the positive feedback schemes are not enabled at all times, but only if there is a certain likelihood that an islanding occurred.

The present disclosure proposes a method for detecting islanding conditions of a distributed grid. The disclosed method can be categorized as an active method. A disturbance is injected to the distributed grid and the islanding conditions are determined on the basis of the effect the disturbance has on one or more monitored quantities of the distributed grid.

The method may, for instance, be implemented on a controller of a power electrical unit. A power electrical unit may be a distributed generator, for instance. The power electrical unit, such as a photovoltaic (PV) inverter, may, for instance, be used for transferring power between a renewable power source, such as a solar panel array, and a distributed power grid. Transfer of power through a power electrical unit in the distributed grid may be controlled on the basis of a control reference.

The method includes a first stage and a second stage. A less pervasive, first stage pre-processing method may first be used in detecting islanding. This pre-processing method may be operational at all times. After a certain confidence of islanding conditions is reached, the second stage may be activated.

The first stage includes injecting a reactive component to the control reference of the power electrical unit. For instance, a relatively small reactive current may be added to an original current reference controlling a current delivered to the distributed grid. Effects on, for instance, voltage amplitude and frequency produced by the injection of reactive current may then be measured.

In other words, the final current reference may be composed of a dominant active (real) component used, for instance, for transferring the power generated in the energy source towards the distributed grid, and an additional, negligible reactive current component. The reactive component may, for instance, take the form of a square wave alternating between an inductive or capacitive current. Since the fundamental frequency of the distributed grid voltage may change during normal operation and during the islanding conditions, the square wave may, for instance, be synchronized with distributed grid voltage signal zero crossing. The alternation may run at a lower frequency. That is, the square wave may alternate from one state to another after a given number of zero crossings.

After injecting the reactive component, a change in the quantity induced by the injected component may be determined for at least one electrical quantity of the grid. A disturbance induced by the injected component can be calibrated such that it causes negligible effects on the voltage signal during normal operation, e.g., when the main grid power is connected. However, it can cause considerable distortions on the grid quantities when the islanding conditions are present.

On the basis of the change in the electrical quantity, it can be determined whether or not to move to the second stage of the disclosed method. For instance, the disturbances on the distributed grid quantities may be measured and compared to predefined thresholds, and each event of the thresholds being exceeded may be counted. The voltage amplitude, phase, frequency, the rate of change of voltage (ROCoV) and the rate of change of frequency (ROCoF) may, for instance, be the grid quantities used.

After a given number of events, it can be presumed that an islanding condition is present, and the second stage can be enabled. A time window within which the events have to occur may be defined. For example, in some embodiments, islanding conditions may be presumed if the given amount of events has occurred within a time window of, for instance, two seconds.

The second stage includes, for at least one electrical quantity of the distributed grid, determining a value of the electrical quantity and forming a positive feedback term using the determined value. Feedback terms may, for instance, be formed from the distributed grid voltage amplitude and frequency. These feedback terms can be used separately, one at the time, or in combination.

The positive feedback term or terms may then be added to the control reference and a change in an electrical quantity or electrical quantities induced by the feedback term or terms can be determined. The positive feedback causes the electrical quantities to abandon their normal operational ranges. The quantities exceed their predetermined, monitored maximum/minimum limits, thus, islanding condition may be determined on the basis of the change in the quantity induced by the feedback term.

In case of the aforementioned voltage amplitude feedback, the active component of the output current reference can be modified by including a positive feedback term formed out of a variation of the distributed grid voltage amplitude. Variation in the active current mainly causes variation in the voltage amplitude. Therefore, if the variation in the voltage amplitude is positively fed back to modify the active current, then, it can be expected that the voltage amplitude will become unstable. The voltage amplitude will exceed the protection limits, which allows islanding detection.

In case of a frequency feedback, the reactive component of the current reference may, for instance, be modified by introducing a positive feedback term formed out of a variation of distributed grid frequency. Variation in the reactive current mainly causes variation in the frequency of the voltage signal. Therefore, if variation in the frequency is positively fed back to modify the reactive current, it can be expected that the frequency will become unstable. The frequency will exceed the protection limits, which allows the islanding detection.

The above disclosed method minimizes noise sensitivity since islanding conditions presumed in the more noise sensitive first stage are confirmed by the second stage. At the same time, possible instabilities can be minimized as the positive feedback of the second stage phase is enabled only if islanding conditions are presumed in the first phase. Unlike methods which check islanding conditions on a regular, periodic basis, the disclosed method can react immediately. The first stage may be continuously active, and the second stage, when activated by the first stage, reacts fast to islanding conditions.

FIGS. 1$a$ to 1$f$ illustrate various segments of an exemplary method for supplying power to a grid in accordance with an exemplary embodiment of the present disclosure. In the embodiment, a distributed generator comprising an inverter supplies a distributed grid. The inverter converts power produced by a power source to a form suitable to be supplied to the grid. In the embodiment, the controller controls the output current of the inverter. The embodied method may, for instance, be implemented on the controller of the inverter.

The exemplary method includes two stages. In the first stage, the rates of change of voltage amplitude (ROCoV) and frequency (ROCoF) are determined. The second stage is based on a positive feedback scheme. Second stage positive feedbacks are enabled when islanding conditions are presumed to have appeared in the first stage.

The following assumptions are made in the context of the exemplary embodiment disclosed herein. Power provided by the power source is assumed constant. A constant power can be used, for instance, in solar power applications where a suitable MPPT (Maximum Power Point Tracking) algorithm guarantees the position of the produced power in the MPP (Maximum Power Point) at all times. It is also assumed that the inverter control guarantees tracking of the grid side current towards its reference.

The only input variables used in the analysis are an output current reference $i^*_0$ and a voltage $v_F$ at the point of common coupling (PCC). The voltage $v_F$ can be a distorted signal containing higher order harmonics of a fundamental frequency $\omega_0$.

In the first stage of the disclosed method, a reactive component is injected to a control reference of a power electrical unit. In the embodiment illustrated in FIGS. 1$a$ to 1$f$, the control reference is represented by a current reference into which a small amount of alternating reactive current is intentionally injected in order to induce disturbances to electrical quantities of the distributed grid. Thus, according to an exemplary embodiment, a current reference is constructed. The current reference for a current supplied to the distributed grid can be defined as follows:

$$i_0^* = \frac{P_{DC}}{v_{F,RMS}^2} v_{F,1}, \quad (1)$$

where $P_{DC}$ is an estimate of the power extracted from the power source, e.g., the maximum available power. The power source may, for example, be a photovoltaic array. $v_{F,1}$ is the fundamental component of the voltage $v_F$ and $v_{F,RMS}$ is the RMS value of the voltage $v_F$.

In Equation 1, the current reference $i_0^*$ is in phase with the voltage $v_F$, and the current reference $i_0^*$ includes only an active current component. A disturbance may, for instance, be induced by injecting a reactive current component to the current reference as follows:

$$i_0^* = \frac{P_{DC}}{v_F^2} v_{F,1} + \frac{Q_{inj}}{v_F^2} \varphi_{F,1}, \quad (2)$$

where $Q_{inj}$ represents a desired reactive power to be injected. $\varphi_{F,1}$ is a square phase signal of the voltage $v_{F,1}$. That is, a signal with the same amplitude and frequency as the voltage $v_{F,1}$, and with a phase shift of 90 degrees ahead.

The desired reactive power $Q_{inj}$ may, for example, be selected to be a percentage x of the delivered active power, $$|Q_{inj}| = x \cdot P_{DC}. \quad (3)$$

In order to comply with, for example, the above-mentioned standards concerning maximum disturbance allowed, the percentage may be limited to a range 0<x≤3%.

If the fundamental component $v_{F,1}$ and/or its square phase signal $\varphi_{F,1}$ are not directly available, they may, for example, be calculated by using an adaptive quadrature signal generator (AQSG) illustrated in FIG. 1a, where an estimated fundamental voltage $\hat{v}_{F,1}$ and an estimated square phase signal $\hat{\varphi}_{F,1}$ are calculated on the basis of the voltage $v_F$ at the point of common coupling and the fundamental frequency $\omega_0$. $\tilde{v}_F$ is a difference term representing the difference between the fundamental component $v_{F,1}$ and its estimate $\hat{v}_{F,1}$. $\gamma_1$ is a positive design parameter used to introduce a specified damping to achieve convergence with stability.

In case the fundamental frequency $\omega_0$ is not available, for example, from an additional PLL, an estimated fundamental frequency $\hat{\omega}_0$ is used instead of the fundamental frequency $\omega_0$. In FIG. 1a, such an estimate is used.

Figure 1B:
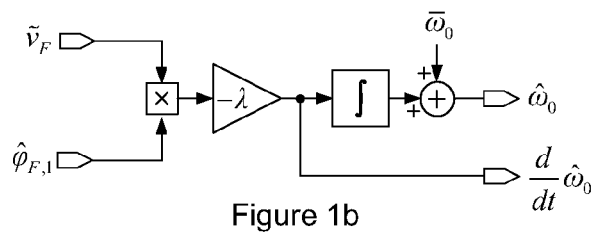

FIG. 1b illustrates a fundamental frequency estimator (FFE) which can, for instance, be used for calculating the estimate $\hat{\omega}_0$ of the fundamental frequency. $\lambda$ is a positive design parameter referred as the adaption gain. $\bar{\omega}_0$ is a nominal value of the fundamental frequency used as a feedforward term to improve the transient response during start up.

In FIGS. 1a and 1b, signals $\hat{v}_{F,1}$, $\hat{\varphi}_{F,1}$, and $\hat{\omega}_0$ are each an output of an integrator. Therefore, the inputs of the integrators can be seen as time derivate terms $$\frac{d}{dt}\hat{v}_{F,1}, \frac{d}{dt}\hat{\varphi}_{F,1}, \text{ and } \frac{d}{dt}\hat{\omega}_0$$

of the signals $\hat{v}_{F,1}, \hat{\varphi}_{F,1}$, and $\hat{\omega}_0$ respectively. The time derivate terms can be used in other parts of this embodiment described later.

The injected reactive current component may, for instance, take the form of a square wave. The current component may alternate between capacitive current and inductive current on the basis of the fundamental voltage. For this purpose, the sign of the fundamental component $v_{F,1}$ can be extracted.

Figure 1C:
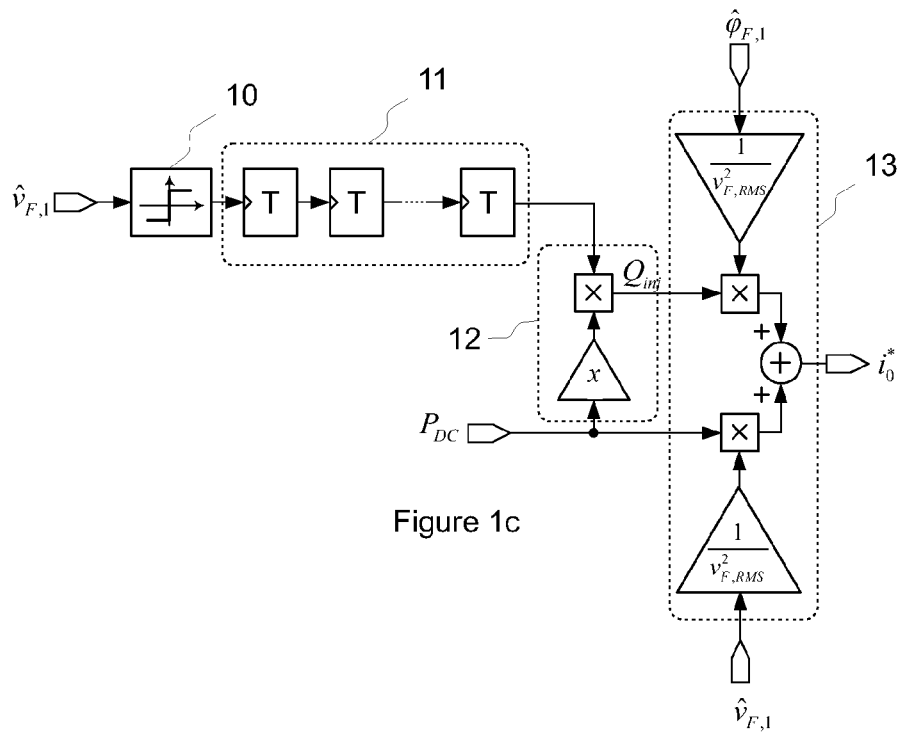

FIG. 1c illustrates a scheme for the first stage where the sign of the estimated fundamental component $\hat{v}_{F,1}$ is extracted by using a comparator 10. The output of the comparator 10 is fed to a series 11 of T-flip-flops where each T-flip-flop divides the frequency by two. This yields a square wave. The square wave can be normalized to have only values −1 or 1. By using the T-flip-flops, the frequency of the square wave is a frequency of a fraction of the fundamental component, and synchronized with the zero crossings of the fundamental component.

For example, three T-flip-flops in series give a square wave alternating every 8$^{th}$ zero crossing of the fundamental component $v_{F,1}$. If the fundamental frequency is 50 Hz, the cycle frequency of the square wave is 6.25 Hz. If a time window for detecting threshold exceeding events in the first stage is, for instance, 2 s, the square wave makes 12.5 cycles in that time window. In other words, the square wave changes its state 25 times in the time window of 2 seconds.

The square wave can now be used to change the sign of the reactive current component to be injected, thus changing its type between capacitive and inductive. In segment 12 of FIG. 1c, the square wave produced by the T-flip-flops is used to produce the injected reactive power $Q_{inj}$. Segment 13 is then used as means for injecting the reactive component to the current reference $i_0^*$. Segment 13 produces the current reference $i_0^*$ according to Equation 2.

Figure 2A:
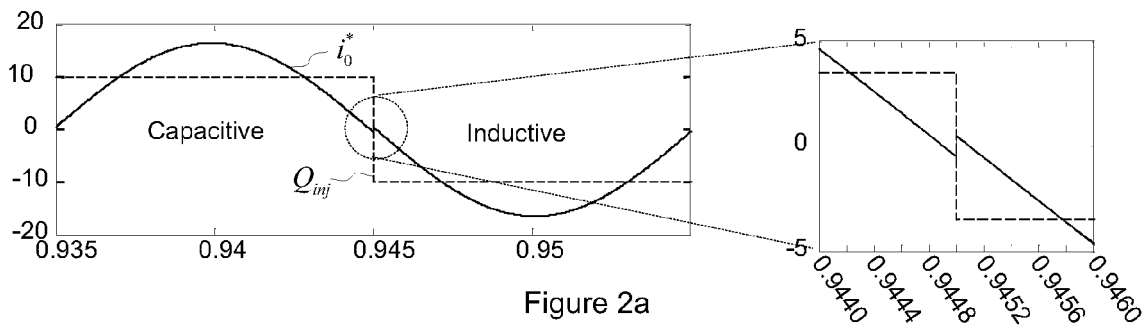
FIGS. 2a and 2b illustrate a current reference in accordance with an exemplary embodiment of the present disclosure.
Figure 2B:
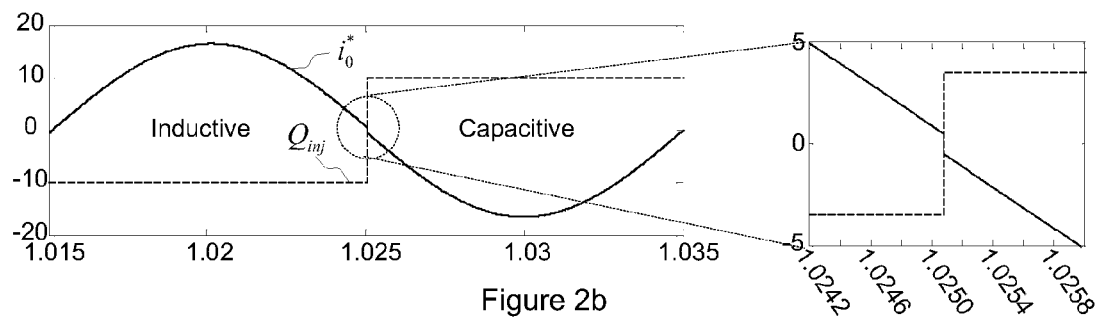

FIGS. 2a and 2b illustrate a current reference in accordance with an exemplary embodiment of the present disclosure. For example, FIGS. 2a and 2b illustrate an example of the resulting current reference $i_0^*$. In FIG. 2a, the reactive power $Q_{inj}$ in dashed line changes from capacitive current to inductive current. The current reference $i_0^*$ is originally sinusoidal but is modified by the injected reactive power $Q_{inj}$. FIG. 2b illustrates a change of the injected reactive power $Q_{inj}$ from inductive current to capacitive current.

In order to detect an event of exceeding a threshold in the first stage of the embodiment illustrated in FIGS. 1a to 1f, variables representing electrical quantities of the distributed grid are created. These variables function as means for determining a change in the quantities induced by the injected reactive power $Q_{inj}$.

The variables should be sensitive to the reactive power $Q_{inj}$ during an islanding condition, but insensitive in normal situations, e.g., during main grid power connection. In other words, when the main grid power is connected, the reactive power $Q_{inj}$ should cause insignificant deviations on such variables. However, in an islanding condition, notable deviations should be expected in the variables.

The exemplary embodiment illustrated in FIGS. 1a to 1f uses two variables related to a rate of change of voltage amplitude (ROCoV) and a rate of change of frequency (ROCoF). Time derivatives of the voltage amplitude and the frequency may be used to determine the rate of change of voltage (ROCoV) and the rate of change of frequency (ROCoF), respectively. The first variable $\delta_\omega$ related to ROCoF can, for instance, be defined as follows:

$$\delta_\omega = \left|\frac{d\omega_0}{dt}\right|. \quad (4)$$

Figure 1D:
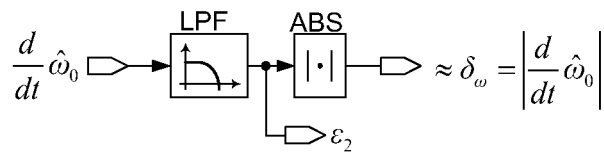

$\delta_\omega$ represents the absolute value (a measurement) of the ROCoF. FIG. 1d illustrates an exemplary implementation for constructing this term. The time derivative $$\frac{d\omega_0}{dt}$$

of the fundamental frequency can, for instance, be obtained from an FFE scheme illustrated in FIG. 1b. A low pass filter (LPF) is included in FIG. 1d to filter out noise existent in this time derivative. Term $\epsilon_2$ can be used in a positive feedback scheme disclosed later.

The second variable $\delta_v$ can, for instance, be defined as follows:

$$\delta_v = \left\langle \frac{d}{dt}\left(\frac{v_{F,1}^2 + \varphi_{F,1}^2}{2}\right)\right\rangle_{RMS} \quad (5)$$

$$= \left\langle v_{F,1}\frac{d}{dt}v_{F,1} + \varphi_{F,1}\frac{d}{dt}\varphi_{F,1}\right\rangle_{RMS}.$$

$\delta_v$ represents the RMS value of the rate of change of the square of the amplitude, and can be considered as a measurement of the ROCoV.

Figure 1E:
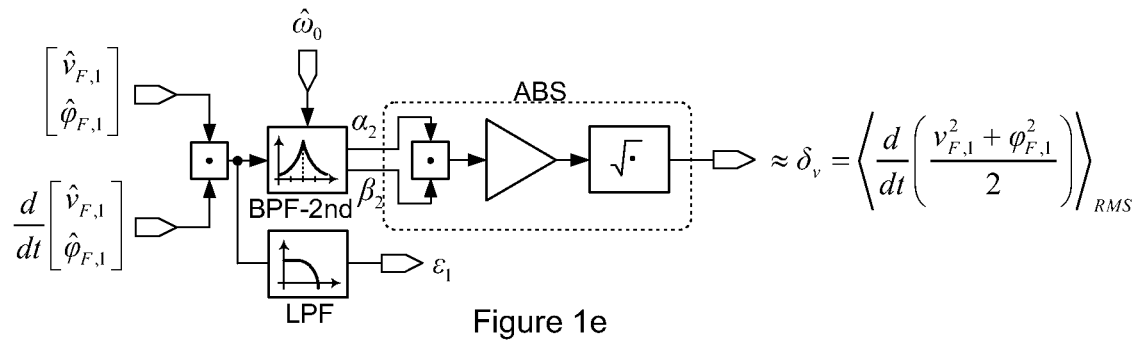

FIG. 1e shows an exemplary block diagram for constructing the second variable $\delta_v$. An estimate $$\frac{d}{dt}\hat{v}_{F,1}$$

of time derivative of the fundamental voltage and an estimate $$\frac{d}{dt}\hat{\varphi}_{F,1}$$

of time derivative of the square phase signal can, for instance, be obtained by using an AQSG as shown in FIG. 1a. The resulting implementation of Equation 5 is based on a dot product of a vector of sinusoidal signals $[\hat{v}_{F,1},\hat{\varphi}_{F,1}]^T$ and a vector of time derivatives of the sinusoidal signals $$\left[\frac{d}{dt}\hat{v}_{F,1}, \frac{d}{dt}\hat{\varphi}_{F,1}\right]^T.$$

This product yields mainly a 2nd harmonic component.

Therefore, a band-pass filter (BPF) tuned at the 2nd harmonic of the fundamental may, as in FIG. 1e, be included to extract this component only, thus, minimizing additional noise. In addition, the BPF delivers a 2nd harmonic component signal $\alpha_2$ and its square phase signal $\beta_2$, out of which an RMS value can be easily computed. The variable $\epsilon_1$ in FIG. 1e can be used in a positive feedback scheme which is disclosed later.

When the main grid is connected, the variables $\delta_\omega$ and $\delta_v$ are almost zero. However, if islanding conditions occur, the variables $\delta_\omega$ and $\delta_v$ grow considerably, thus, exceeding their corresponding thresholds $T_\omega$ and $T_v$. The threshold $T_\omega$ for the variable $\delta_\omega$ can, for instance, be tuned according to the following expression:

$$T_\omega = 0.5\lambda\pi v_{F,RMS}^2\left|1 - \sqrt{1+\frac{x}{2}}\right|, \quad (6)$$

where a criterion of 50% of the maximum expected peak value of measurement is used for the variable $\delta_\omega$. The parameter x represents a percentage of the reference power $P_{DC}$. It is used to fix the amplitude of the injected reactive current. In order to comply with standards concerning maximum disturbance allowed, the percentage x may, for instance, be limited to a range 0<x≤3%.

Accordingly, the threshold $T_v$ can be formed for the variable $\delta_v$, for instance, as follows:

$$T_\omega = 0.5\lambda\pi v_{F,RMS}^2\left|1 - \sqrt{1+\frac{x}{2}}\right|. \quad (7)$$

On the basis of the changes in variables $\delta_\omega$ and $\delta_v$, it can be determined whether or not to move to the second stage of the embodiment illustrated in FIGS. 1a to 1f. The idea consists in counting, within a time window, events of deviations of the variables $\delta_\omega$ and $\delta_v$ exceeding their given thresholds $T_\omega$ and $T_v$.

Figure 3A:
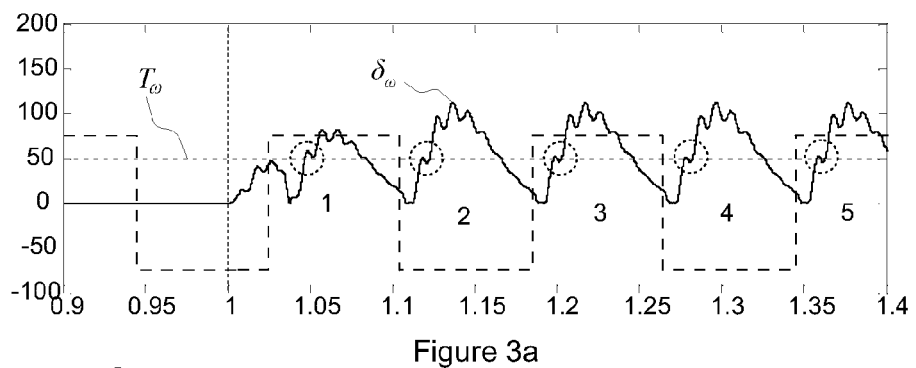
FIGS. 3a and 3b illustrate an example of detecting islanding conditions in accordance with an exemplary embodiment of the present disclosure.
Figure 3B:
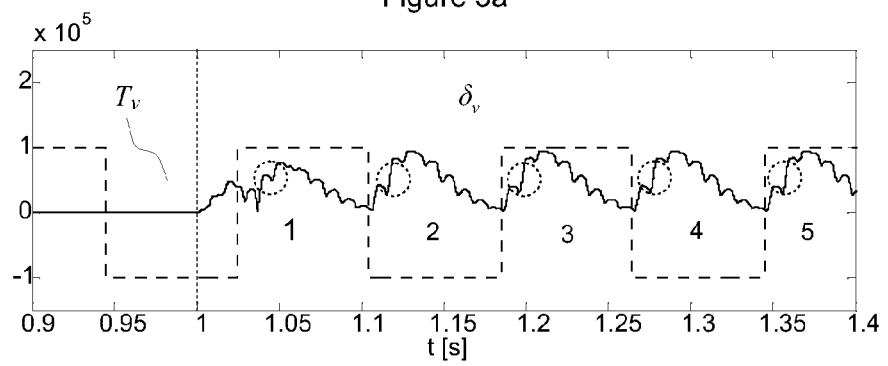

FIGS. 3a and 3b illustrate an example of detecting islanding conditions in accordance with an exemplary embodiment of the present disclosure. For example, FIGS. 3a and 3b illustrate an example of the first stage of detecting islanding conditions using the embodiment illustrated in FIGS. 1a to 1f. FIG. 3a shows the effect of islanding conditions on the variable $\delta_\omega$ representing the rate of change of frequency (ROCoF). FIG. 3b shows the effect of islanding conditions on the variable $\delta_v$ representing the rate of change of voltage (ROCoV).

In FIGS. 3a and 3b, the fundamental frequency is 50 Hz. The embodiment illustrated in FIGS. 1a to 1f has three T-flip-flops, and, as a result, the reactive current component (dashed line) shaped as a square wave has a cycle frequency of 6.25 Hz. Thus, the reactive current component changes between capacitive and inductive currents every 0.08 s. The islanding is produced at time t=1 s, after which the excursions of both variables $\delta_\omega$ and $\delta_v$ grow considerably, thus exceeding their thresholds $T_\omega$ and, respectively $T_v$.

In both FIGS. 3a and 3b, five events (dotted circles) have been collected in a period of about 0.4 s. Only the first event per a change of the reactive current component is detected in order to reduce sensitivity to noise. The variable $\delta_\omega$ or the variable $\delta_v$ can be used alone or both can be used in combination in counting events.

Once a certain number of events, for instance, around 5 to 10, have been collected, it can be presumed that an island condition has occurred. To confirm this situation, the second stage of the embodiment illustrated in FIGS. 1a to 1f may be enabled.

The second stage includes, for at least one electrical quantity of the distributed grid, means for determining a value of the electrical quantity and forming a positive feedback term using the determined value. The purpose of the positive feedback is to drive voltage amplitude or frequency away from a normal operation range, for example, in such a way that values of the determined electrical quantities exceed the over/under voltage protection (OVP/UVP) and/or over/under frequency protection (OFP/UFP) limits. Changes in electrical quantities induced by the feedback terms can be determined, for instance, by measuring, and, the islanding condition may be determined on the basis of the changes.

Figure 1F:
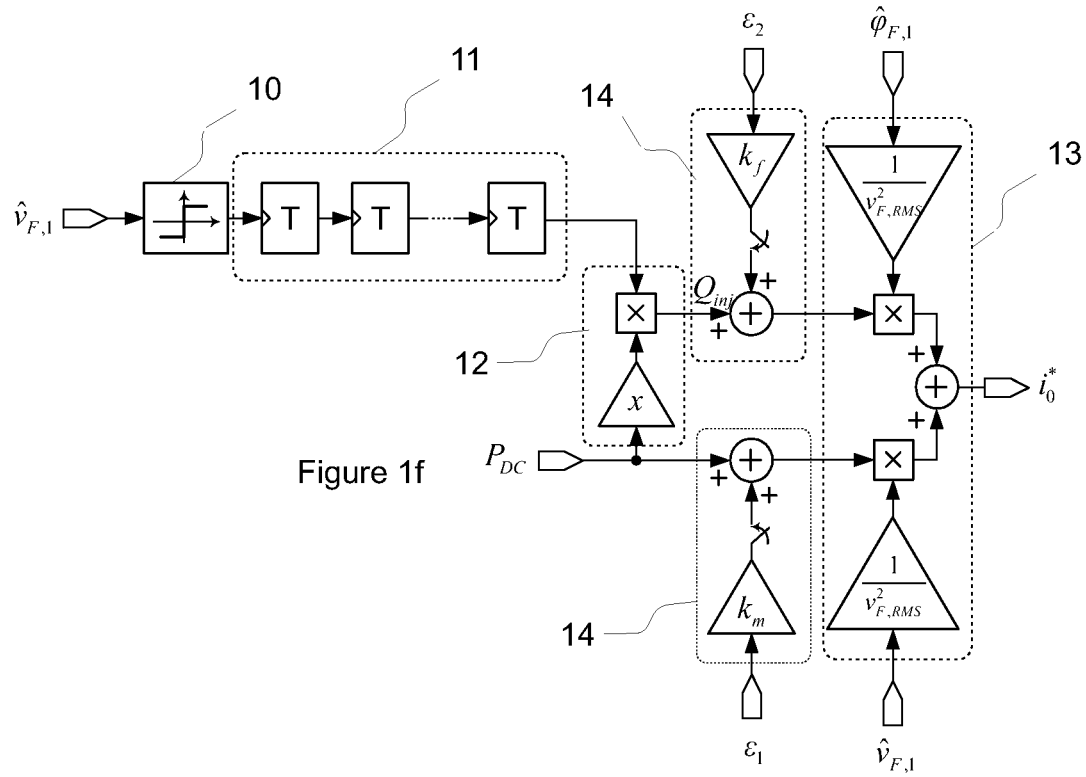

FIG. 1f illustrates a block diagram of an implementation of the second stage which extends the scheme of FIG. 1c by adding positive feedback terms 14 to the control reference. The feedback terms 14 may be enabled when the second stage is activated. The implementation uses terms $\epsilon_2$ and $\epsilon_1$ presented in FIGS. 1d and 1e. Term $\epsilon_2$ contains information on the frequency variation while term $\epsilon_1$ contains information on the voltage amplitude variation.

In FIG. 1f, terms $\epsilon_2$ and $\epsilon_1$ are fed back by means of positive gains $k_f$ and $k_m$, respectively. Term $\epsilon_1$ adds to the reference power $P_{DC}$, thus modifying the amplitude of the active part of the current reference $i^*_0$. As mentioned before, the main effect of the active current is in the voltage amplitude. As a result, the added term $\epsilon_2$ renders the voltage amplitude unstable.

At the same time, term $\epsilon_2$ is added to the injected reactive power $Q_{inj}$ modifying the amplitude of the reactive part of the current reference $i^*_0$. The main effect of the reactive current is in the frequency of the voltage signal. This creates a positive feedback loop that renders the frequency unstable. The positive feedback may also be implemented by using only either $\epsilon_2$ or $\epsilon_1$.

The performance of the embodiment illustrated in FIGS. 1a to 1f was simulated using a test setup proposed in standards UL 1741 and IEEE 929[4, 6]. The test setup used a balanced RLC load 20 connected in parallel to the power electrical unit as shown in FIG. 4.

Figure 4:
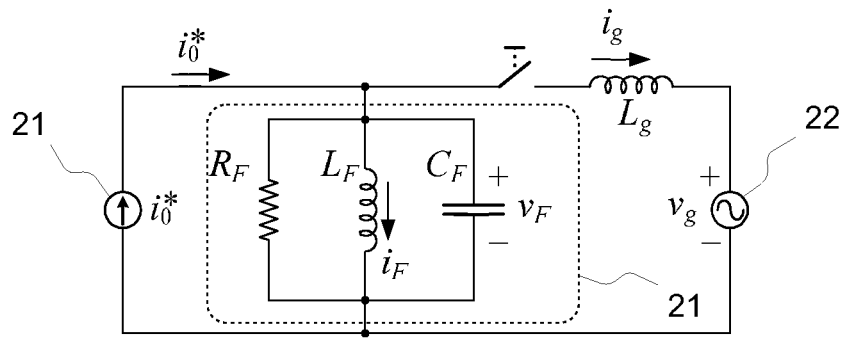
FIG. 4 illustrates a test setup using a balanced RLC load connected in parallel to the power electrical unit in accordance with an exemplary embodiment of the present disclosure.

FIG. 4 illustrates a test setup using a balanced RLC load connected in parallel to the power electrical unit in accordance with an exemplary embodiment of the present disclosure. In FIG. 4, the power electrical unit 21, such as a PV inverter, was represented by a simple current source as it was assumed that the output current $i_0$ delivered to the distributed grid follows its reference $i^*_0$ an arbitrarily short time. The current source 21 provided power to a main grid 22 represented by a voltage source producing a voltage $v_g$. The power $P_{DC}$ provided by the source 21 was assumed constant. The range of the current reference $i^*_0$ was dimensioned such that it is able to deliver the maximum available power from the energy source to the main grid $v_g$.

In the simulations, a peak value $V_{peak}$ of the main grid 22 voltage $v_g$ was 325 V, an active delivered power $P_{DC}$ by the current source 21 was 2680 W, and the fundamental frequency $\omega_0$ was $100\pi$ rad/s (50 Hz). In FIG. 4, an inductance $L_g$ of 10 mH was used for the main grid 22. $v_F$ represented the voltage at the point of common coupling (PCC), and $i_g$ represented the current supplied to the main grid 22.

According to the standards, elements $L_F$ and $C_F$ of the RLC load 20 were to be dimensioned in such a way that the resonance frequency of the RLC load 20 coincided with the nominal fundamental frequency $\omega_0$ of the main grid $v_g$, e.g., $$\omega_0 = \frac{1}{\sqrt{L_F C_F}}. \tag{8}$$

The resistor $R_F$ of the RLC load 20 was designed to match the active power generated by the current source 21, and the power quality factor Q, defined as follows:

$$Q = R_F \sqrt{\frac{C_F}{L_F}}, \tag{9}$$

was defined to be equal to or higher than 2, e.g., Q≥2. This yielded the following expressions for computing values for the elements of RLC load 20:

$$R_F = \frac{V_{peak}^2}{2P_{DC}}, \tag{10}$$

$$L_F = \frac{V_{peak}^2}{2\omega_0 Q P_{DC}} = \frac{R_F}{\omega_0 Q},$$

$$C_F = \frac{2Q P_{DC}}{\omega_0 V_{peak}^2} = \frac{Q}{\omega_0 R_F}.$$

Based on Equations 10, the elements of the RLC load 20 had the following values: $R_F$=19.7Ω, $R_F$=31.4 mH, and $R_{F=323.1}$ μF For the AQSG according to FIG. 1a and the FFE according to FIG. 1b gains $\gamma_1$=100 and $\lambda$=0.1 were selected, respectively. The positive feedback loop gains have been fixed to $k_m$=0.01 and $k_f$=4. The thresholds were tuned according to Equations 5 and 6 to values $T_\omega$=61.98 and $T_v$=0.438·10⁵. Three T-flip-flops were used to generate a square wave, which yielded a cycle frequency of 6.25 Hz, thus, giving a change of state of the square wave in every 0.08 s. The second stage was set to be enabled if five events occurred within two seconds. An under/over frequency protection (UFP/OFP) limit of the second phase was set to 5%, and an under/over voltage protection (UVP/OVP) limit of the second phase was set to 10%. The main grid power was disconnected at t=1 s. Therefore, it was expected that the islanding situation would be detected in the simulations before t=3 s. Simulation results are shown in FIGS. 5a, 5b, 6a, 6b, 7a, 7b, and 8.

Figure 5A:
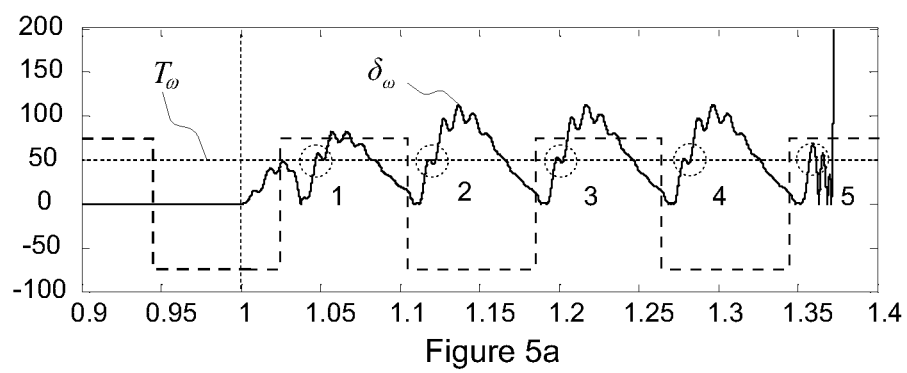
FIGS. 5a and 5b illustrate a simulated response to disconnection of the main grid power in accordance with an exemplary embodiment of the present disclosure.
Figure 5B:
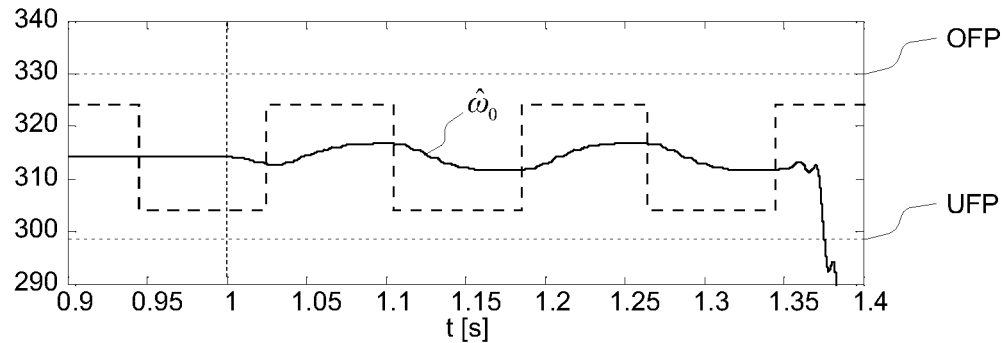

FIGS. 5a and 5b illustrate a simulated response to disconnection of the main grid power in accordance with an exemplary embodiment of the present disclosure. For example, FIGS. 5a and 5b illustrate a simulated response of the variable and the estimated fundamental frequency $\hat{\omega}_0$ to disconnection of the main grid 22 power. Before the disconnection at t=1 s time, the oscillations in both $\delta_\omega$ and $\hat{\omega}_0$ were negligible. However, they grew considerably during the main grid 22 disconnection. The positive feedback was enabled after 5 events of $\delta_\omega$ exceeding the threshold $T_\omega$, as shown in FIG. 5a near t=1.355 s. Once the positive feedback was enabled, the estimated frequency $\hat{\omega}_0$ decreased very fast exceeding almost immediately the UFP/OFP fixed at ±5%.

Figure 6A:
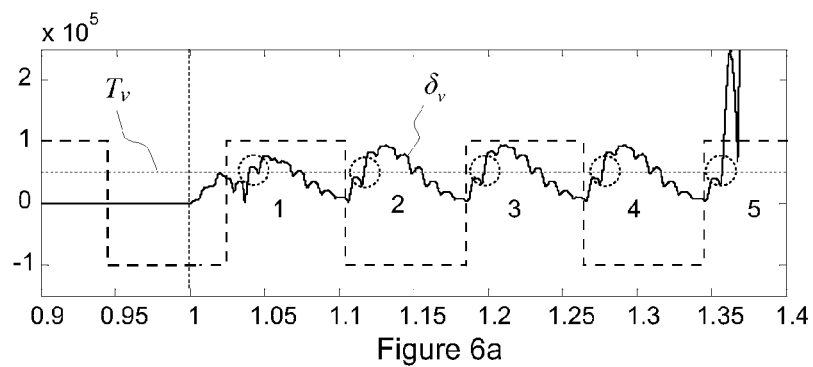
FIGS. 6a and 6b illustrate a simulated response to disconnection of the main grid power in accordance with an exemplary embodiment of the present disclosure.
Figure 6B:
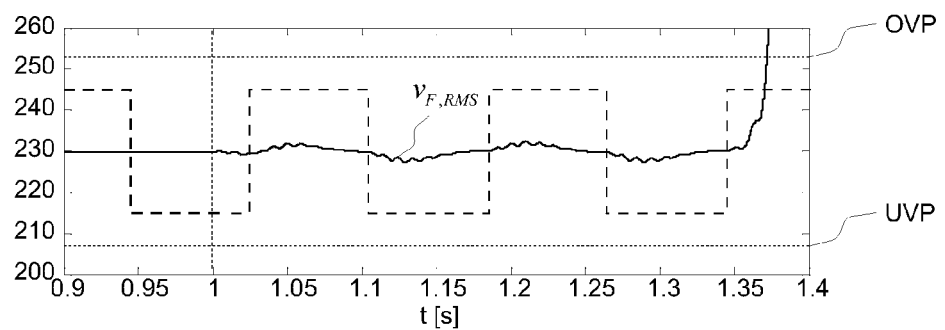

FIGS. 6a and 6b illustrate a simulated response to disconnection of the main grid power in accordance with an exemplary embodiment of the present disclosure. For example, FIGS. 6a and 6b show a simulated response of the variable $\delta_v$ and an RMS value $v_{F,RMS}$ of the voltage $v_F$ to disconnection of the main grid 22 power. Before the main grid power was disconnected at t=1 s, the oscillations in both $\delta_v$ and the RMS value $v_{F,RMS}$ were negligible. However, they grew considerably during the main grid 22 disconnection. As in FIGS. 5a and 5b, the second stage was enabled after five events of $\delta_v$ exceeding the threshold $T_v$ as shown in FIG. 6a. This happened also at around t=1.355 s. Once the second stage was enabled, the RMS voltage $v_{F,RMS}$ increased very fast exceeding almost immediately the UVP/OVP limits set at ±10%.

Figure 7A:
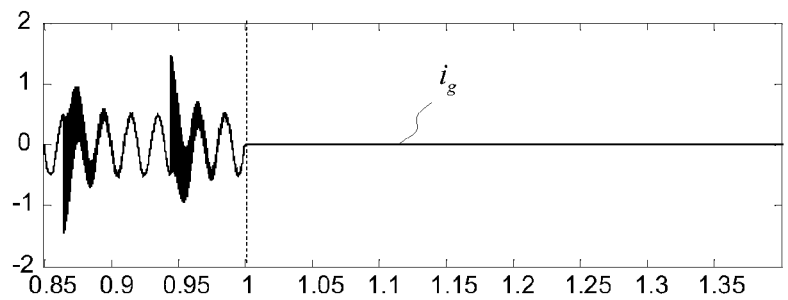
FIGS. 7a and 7b show a simulated time response of the main grid current and the current reference in accordance with an exemplary embodiment of the present disclosure.
Figure 7B:
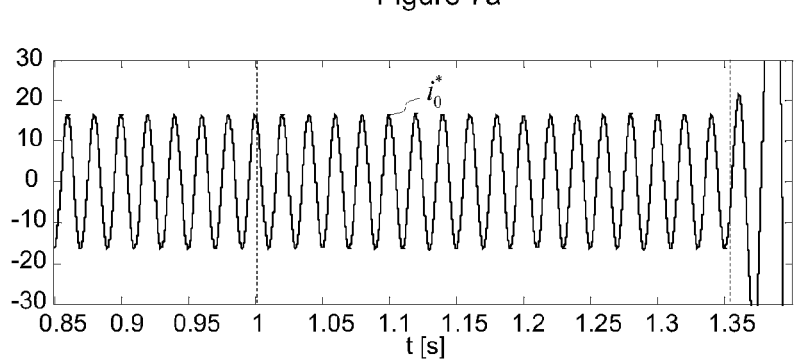

FIGS. 7a and 7b show a simulated time response of the main grid current and the current reference in accordance with an exemplary embodiment of the present disclosure. For example, FIGS. 7a and 7b show a simulated time response of the main grid 22 current $i_g$ and the current reference $i^*_0$. The main grid 22 current $i_g$ shown in FIG. 7a was already very small compared to the current reference $i^*_0$ shown in FIG. 7b, as most part of the current reference $i^*_0$ was going through the RLC load 20. In fact, only a current due to the disturbance caused by the small reactive current injection appeared in FIG. 7a. As expected, the main grid 20 current $i_g$ reduced to zero in FIG. 7a when the main grid 20 power was disconnected at t=1 s. The current reference $i^*_0$ retained approximately similar shape and amplitude during main grid 22 disconnection until the positive feedback was enabled near t=1.355 s. After that, the current reference $i^*_0$ started growing rapidly.

Figure 8:
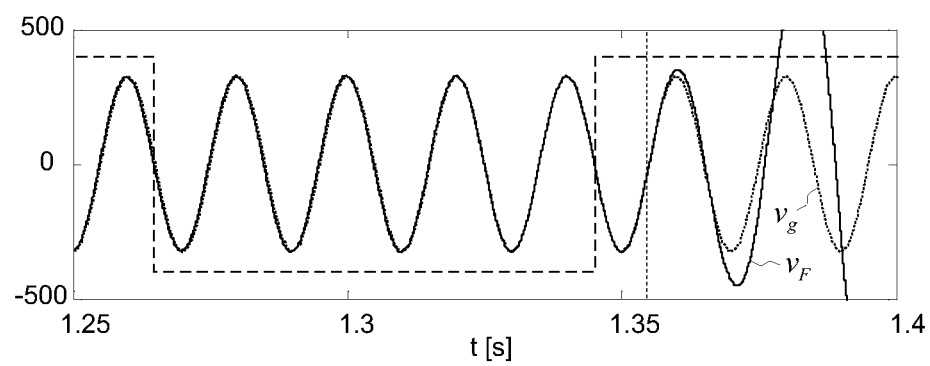
FIG. 8 illustrates a simulated time response of the main grid voltage and the voltage at the PCC in accordance with an exemplary embodiment of the present disclosure.

FIG. 8 illustrates a simulated time response of the main grid voltage and the voltage at the PCC in accordance with an exemplary embodiment of the present disclosure. For example, FIG. 8 shows a simulated time response of the main grid 22 voltage $v_g$ (dotted line), and the voltage $v_F$ at the PCC (solid line). Both voltages retain approximately similar shape and amplitude. However, once the positive feedback is enabled near t=1.335 s, the amplitude and frequency of the voltage $v_F$ start changing considerably.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method for detecting islanding conditions of a distributed grid, wherein transfer of power through a power electrical unit in the distributed grid is controlled on the basis of a control reference, the method comprising:
   a first stage and a second stage, wherein the first stage comprises:
      injecting a reactive component to the control reference; and
      for at least one electrical quantity of the grid:
         determining a change in the quantity induced by the injected component, and
         determining, on the basis of the change in the electrical quantity,
      whether to move to the second stage of the method, and
   wherein the second stage comprises, for at least one electrical quantity of the grid:
      determining a value of the at least one electrical quantity;
      forming a positive feedback term using the determined value;
      adding the positive feedback term to the control reference;
      determining a change in an electrical quantity induced by the feedback term; and
      determining an islanding condition on the basis of the change in the quantity induced by the positive feedback term.

2. The method according to claim 1, wherein the transfer of power is controlled on the basis of a current reference.

3. The method according to claim 2, wherein injecting a reactive component to the control reference comprises:
   injecting a reactive current component to the current reference, wherein the injected reactive current component takes the form of a square wave alternating between an inductive or a capacitive current.

4. The method according to claim 1, wherein the reactive component is a square wave synchronized to zero crossings of a fundamental wave of a voltage of the grid.

5. The method according to claim 1, wherein determining a change in the quantity induced by the injected component in the first stage comprises:
   determining a change in the rate of change of the distributed grid voltage by the injected component.

6. The method according to claim 1, wherein determining a change in the quantity induced by the injected component in the first stage comprises:
   determining a change in the rate of change of the distributed grid frequency by the injected component.

7. The method according to claim 5, wherein an estimate of the rate of change of the voltage is calculated by using an adaptive quadrature signal generator, and an estimate of the rate of change of the distributed grid frequency is calculated by using a fundamental frequency estimator.

8. The method according to claim 1, wherein determining whether to move to the second stage of the method comprises:
   comparing the change induced by the injected component in at least one electrical quantity to a predetermined limit;
   counting events of the change exceeding the limit; and
   proceeding to the second stage, if the amount of events exceed another limit within a set time window.

9. The method according to claim 1, wherein the second stage comprises:
   forming a positive feedback term on the basis of the frequency variation of the distributed grid; and
   adding the positive feedback term to the active part of the control reference.

10. The method according to claim 1, wherein the second stage comprises:
    forming a positive feedback term on the basis of the amplitude variation of the distributed grid; and
    adding the positive feedback term to the reactive part of the control reference.

11. An apparatus for detecting islanding conditions of a distributed grid, wherein transfer of power through a power electrical unit is controlled on the basis of a control reference, the apparatus comprising:
    a first stage and a second stage, wherein the first stage comprises:
       means for injecting a reactive component to the control reference; and
       for at least one electrical quantity of the grid:
       means for determining a change in the quantity induced by the injected component,
          means for determining, on the basis of the change in the electrical quantity, whether or not to enable the second stage, and
       wherein the second stage comprises, for at least one electrical quantity of the grid,
       means determining a value of the electrical quantity;
       means for forming a positive feedback term using the determined value;
       means for adding the positive feedback term to the control reference;
       means for determining a change in an electrical quantity induced by the positive feedback term; and
       means for determining islanding condition on the basis of the change in the quantity induced by the positive feedback term.

12. A photovoltaic inverter comprising an apparatus according to claim 11.

* * * * *